United States Patent
Strasser

Patent Number: 6,079,762
Date of Patent: Jun. 27, 2000

[54] SIDE WALL FOR A VEHICLE BODY

[76] Inventor: Johann Strasser, Bahnweg 1, Eugendorf, 5301, Austria

[21] Appl. No.: 09/091,159

[22] PCT Filed: Oct. 17, 1996

[86] PCT No.: PCT/AT96/00200

§ 371 Date: Jun. 9, 1998

§ 102(e) Date: Jun. 9, 1998

[87] PCT Pub. No.: WO97/34793

PCT Pub. Date: Sep. 25, 1997

[30] Foreign Application Priority Data

Mar. 21, 1996 [AT] Austria ................................... A527/96
Apr. 18, 1996 [EP] European Pat. Off. .............. 96890070

[51] Int. Cl.[7] .................................................. B62D 27/00
[52] U.S. Cl. ............................. 296/36; 160/188; 160/210
[58] Field of Search .................................. 160/210, 213, 160/188; 296/360, 56, 181, 183, 148; 49/339, 340, 331, 332; 16/61, 63, 65, 67

[56] References Cited

U.S. PATENT DOCUMENTS

| | | | |
|---|---|---|---|
| 2,238,181 | 4/1941 | Morgan | 160/213 |
| 2,334,749 | 11/1943 | Burr | 160/210 |
| 3,864,875 | 2/1975 | Hewitt | 49/340 |
| 4,268,084 | 5/1981 | Peters | 296/148 |
| 4,793,398 | 12/1988 | Hoff et al. | 160/213 |

FOREIGN PATENT DOCUMENTS

| | | |
|---|---|---|
| 719007 | 1/1969 | Belgium . |
| 744868 | 1/1970 | Belgium . |
| 2418734 | 7/1978 | France . |
| 2710019 | 9/1993 | France . |
| 2638972 | 8/1976 | Germany . |
| 2919608 | 5/1979 | Germany . |
| 3046178 | 8/1980 | Germany . |
| 3102891 | 1/1981 | Germany . |
| 9108949 | 7/1991 | Germany . |
| 9218398 | 6/1992 | Germany . |
| 29507084 | 4/1995 | Germany . |

*Primary Examiner*—Blair M. Johnson
*Attorney, Agent, or Firm*—Jacobson, Price, Holman & Stern, PLLC

[57] ABSTRACT

The invention relates to a side wall for the body 1, 2, 3 of a vehicle, having at its upper longitudinal edge an upper wall portion 4 pivotably connected to the vehicle body 1, 2, 3 via a first horizontal pivot pin 6, and a lower wall portion 5 which at its upper longitudinal edge is hingeably disposed on the lower longitudinal edge of the upper wall portion 4, while engaging with at least one of the two lateral edges of the upper wall portion 4 is a lifting arm 8 which is articulated via its other end to the upper transverse frame portion 2 of the vehicle body via a third, driven pivot pin 9 parallel with the first pivot pin 6 and the second pivot pin 7. To provide a side wall which can be readily opened and closed in a space saving manner over a large zone of the particular vehicle side and which at the same time enables the vehicle to be safely driven in the open state, an undriven link 13 engages by one of its ends via a pivot pin 12 with one of the two lateral edges of the lower wall portion 5 and is at its other end articulated to the vehicle body 1, 2, 3, the distance between the ends 12, 16 of the or each link 13 being adjustable, or at least one end 12, 16 of the or each link 13 or an element or the like connected thereto being displaceably mounted.

19 Claims, 12 Drawing Sheets

SIDE WALL FOR A VEHICLE BODY

The invention relates to a side wall for the body of a vehicle, for example, a lorry, freight trucks or the like, having at its upper longitudinal edge an upper wall portion pivotably connected via a first horizontal pivot pin to the vehicle body, and a lower wall portion which at its upper longitudinal edge is hingeably disposed via a second pivot pin parallel with the first pivot pin on the lower longitudinal edge of the upper wall portion, while a lifting arm engages (via one of its arms) with at least one of the two lateral edges of the upper wall portion, preferably adjacent its lower longitudinal edge, and is articulated by its other end to the upper transverse frame portion of the vehicle body via a third pivot pin which is parallel with the first pivot pin and the second pivot pin and which can be pivoted by means of a drive preferably formed by a hydraulic piston and cylinder unit, the two wall portions forming in one of their end positions a vertical plane wall for closing a loading opening of the vehicle body and in their other end position occupying a location above the roof of the vehicle body which completely opens up the loading opening.

The term "side wall" covers all accessible sides, including the rear side of the vehicle body. Fixed coverings of a vehicle body—i.e., coverings other than tarpaulins—must be removed pivoted or displaced for the purpose of loading or unloading. The displacement of side walls in the side wall plane as is, for example, customary with freight trucks, requires a lot of space in addition to the actual loading opening, which can therefore occupy only a portion of the total side wall length. With lorries also, this variant can be used only for very long sides, where guides can be provided for the displacement of the side wall. Moreover, it is impossible for the vehicle to be driven safely with side wall portions open and more particularly displaced in the direction of the drivers cab. Again, the pivoting of complete side walls requires a lot of space laterally of or above the vehicle, so that this variant is unsuitable for the opening of a vehicle body in practice. Due to the considerable torque, actuation would also be too costly and complicated.

A remedy was sought in dividing the side walls. However, just like sliding doors, vertically divided pivotable side walls—i.e., substantially horizontally pivotable doors—offer no protection against the effects of weather during loading and unloading. The possibility of travelling with the body open depends on the position of the open side wall or side wall portion. Horizontally divided side walls in which a side wall portion is hinged downwards also prevent travel with the side wall open, since it scrapes or knocks against the ground or the vehicle.

DE 26 38 972 A1 discloses a box body for lorries wherein the wall takes the form or a folding flap consisting of at least two hingeably interconnected individual portions, the upper wall portion being hingeably connected to the vehicle body. In its lower edge zone the lower wall portion is provided with rollers which engage in guides in the vehicle body. The construction disclosed in DE 31 02 891 A1 is characterised by a door flap divided in two, the lower portion of the door flap being moved upwards by a pivoted lever. In these two constructions the wall can be hinged upwards only by 90° or somewhat more, and can therefore provide protection against the weather during loading and unloading. However, the upwardly hinged wall forms an obstacle to stacking personnel and means that the vehicle can be manoeuvred only to a limited extent.

The loading wall of a lorry as disclosed in DE 29 19 608 A1 is subdivided into an upper and lower wall portion and can be hinged upwards by means of a cable pull which engages with the lower edge zone of the lower side wall portion. Complete upward hinging is made possible by an upwardly hingeable roof portion. However, the mechanism required for this purpose is very expensive and moreover cable pulls present a risk in comparison with the use of levers or links, since if the cable breaks the loading wall might drop down and injure people. DE 30 46 178 A1 discloses a similarly constructed lorry body wherein the side wall portions can be folded together and pulled into the loading space beneath the vehicle roof. It is true that, as a result, the side wall portions form no obstacle to stacking personnel and allow the vehicle to be manoeuvred, but a proportion of the valuable loading volume is lost for the accommodation of the side wall.

FR 2 710 019 A1 also discloses an upwardly hingeable lorry body side wall which is divided into two horizontal portions, the upper side wall portion being pivotable by levers, and the lower side wall portion, which is hingeably disposed on the lower side wall portion, being freely pivotably attached. The entire side wall can be pivoted as far as over the roof, the height of the folded-up side wall on the roof corresponding to the height of the lower wall portion. The freely pivoting lower wall portion involves a risk of injury to persons and damage to vehicles or buildings.

It is an object of the invention to provide a side wall for the body of a vehicle which can be readily opened and closed in as space-saving a manner as possible for a large zone of the particular vehicle side by means of a drive and which at the same time enables the vehicle to be driven safely with the side wall open and obviates the aforementioned disadvantages. In addition, it enables the side wall to be reliably closed without additional ancillary means.

This problem is solved by the features that an undriven link engages by one of its ends via a pivot pin with one of the two lateral edges of the lower wall portion and is at its other end articulated to the vehicle body, the distance between the ends of the or each link being adjustable, or at least one end of the or each link for an element or the like connected thereto being displaceably mounted. The or each link guides the lower wall portion reliably during the pivoting movement, prevents any dangerous swinging, knocking or the like, and limits the possible distance of the side wall portion from the vehicle body. The partially open side wall acts as protection against the weather and allows safe loading and unloading. Furthermore, there is no risk of injury or damage during opening or closing. Since no side wall portions are hinged downwards or can come into contact with the ground. Even with the side wall opened safe driving is rendered possible. Due to the lower torques involved, and the smaller maximum radial distance between the outermost edge of the side wall and the pivot pin, the driving device for opening and closing the side wall can also be smaller in construction and therefore occupy less space. The nature of the drive via the third pivot pin and the or each lifting arm means that force is introduced radially outside the pivoting axis of the wall portion, so that no excessive bending or kinking forces can be generated and the side wall according to the invention can even be made from soft, non-rigid wall elements. Safe closure is ensured by the adjustment of the distance between the ends of the link or by the displaceable bearing of at least one of its ends. As a result, during the closure of the vehicle wall the lower longitudinal edge of the lower wall portion contacts the vertical portion of the vehicle body at an angle and then moves along the vertical portion of the vehicle body, while lengthening the link or displacing one of its ends, until the side wall has been completely closed and the lower wall portion is also disposed vertically parallel with the vertical portion of the vehicle body. Until the lower portion contacts the vehicle body, the link performs a purely rotary movement which, after the lower portion contacts the vehicle body, passes into a substantially exclusively longitudinal movement. This ensures that the vehicle side wall is reliably guided in a corresponding guide or the like on the vehicle body. No additional closure means such as, for example, hooks or bolts, are required and the driver of the vehicle need not open any hooks or remove any bolts prior to the opening of the side wall.

Advantageously, due to the spatial conditions, the third pivot pin is disposed adjacent the first pivot pin, preferable offset in the direction of the centre of the vehicle.

Alternatively, the third pivot pin can also be disposed coaxially of the first pivot pin.

If the first pivot pin does not coincide with the third pivot pin, length compensation must be provided for the lifting arm, to enable the side wall to be pivoted. To this end, according to another feature of the invention, the end of the or each lifting arm or a guide element such as, for example, a pin or the like, which is articulated to the upper wall portion, can be displaced in the plane of the upper wall portion. With a fixed point of articulation of the or each lifting arm on the upper wall portion, the or each lifting arm might also be constructed variable in length, for example, in the form of a telescopic rod formed by two or more telescopically tubular members.

Advantageously, the end of the or each lifting arm or the guide element such as, for example, the pin or the like which is connected to the upper wall portion is guided in a guide provided in the plane of the upper wall portion and preferably taking the form of a groove, profile or the like. This is a simple, stable and trouble-free constructional variant, which ensures that the wall portion can be pivoted if the first and third pivot pins do not coincide.

According to another feature of the invention the pivot pin is disposed adjacent the lower longitudinal edge of the lower wall portion, and the other end of the or each link is articulated to an upright of the vehicle body in the centre between the third pivot pin connected to the or each lifting arm and the pivot pin. This construction makes possible a maximum pivoting range and ensures that the lower wall portion does not project from the vehicle substantially further than the length of the link.

The side wall can be closed without further ancillary means if the lower longitudinal edge of the lower wall portion has an attachment, preferably a chamfer pointing in the direction of the centre of the vehicle, while provided on the vehicle body is a retaining means, preferably a chamfer complementary to the chamfer of the lower wall portion, which engages diametrically oppositely over said attachment in the closed end position of the side wall. Shortly before the side wall reaches the closed end position, the attachment of the lower portion engages in the retaining means of the vehicle body and completes closure in a problem-free and reliable manner. Locking against accidental opening is ensured at the same time. A chamfer is a simple constructional possibility which operates reliably.

According to another feature of the invention the first pivot pin is disposed outside an upper corner zone of the vehicle body, preferably covering at least 90°, and the or each lifting arm can preferably pivot through the total free angular zone, so that in their open end position above the vehicle roof the two wall portions can be folded together substantially parallel with one another and lie on the roof. As a result, the side wall can be completely pivoted out of the zone of the loading opening, so that as large an area as possible is left free for loading work and the space required by the vehicle is minimal.

Preferably, the movable part of the drive, preferably the piston rod of the hydraulic piston and cylinder unit is connected to a flexible element, for example a chain, cable or toothed belt, said element being guided over a curved guide which is non-rotatably connected to the end of the lifting arm pivotably articulated to the vehicle body. Such a drive is inexpensive and highly reliable operationally. Of course, other variants of the drive for the lifting arm are conceivable, for example, rotary drives for its axis of attachment and pivoting, conversion of the linear movement of the piston into a rotary movement by means of a rack and pinion on the pivot of the lifting arm and the like.

A special embodiment the adjustability according to the invention of the distance between the ends of the or each link is effected by a spring, for example, a pneumatic spring, spiral spring or the like disposed along the link. Pneumatic springs are common and therefore inexpensive ancillary means, more particularly in vehicle construction, so that this embodiment has particular simplicity. If a pneumatic spring is used, conveniently it is one which responds to pressure.

Alternatively, the or each link is resiliently curved in the shape of an arc, so that the distance between the ends of the link can be adjusted. The distance between the ends of the links could therefore be adjusted without changing the actual length of the link. Such a link prestressed in the form of an arc can be very cheaply manufactured, for example, from spring steel or plastics. This embodiment is particularly simple and is therefore also inexpensive and maintenance-free.

If the or each link has a fixed length and one end of the or each link or an element or the like connected thereto is mounted resiliently displaceably, the same technical effect can be achieved as in the case of the two aforementioned embodiments of the invention, merely a virtual change in the length of the link taking place. Resilient displaceability can be provided in the plane of the second wall portion or in the plane of the upright of the vehicle body and preferably take the form or a groove, profile or the like and a return spring or the like.

It is also an object of the invention to make it easier to climb up onto the loading surface of the vehicle, something which is very difficult for the personnel to do, unless the vehicle is loaded or unloaded upon a ramp.

This problem is solved according to the invention by the feature that the undercarriage protection takes the form of a hingeable platform. This facilitates loading and unloading in conjunction with the side wall according to the invention. The regulations with many countries require a lateral undercarriage protection for lorries. The undercarriage protection according to the invention serves an additional purpose during the loading or unloading of the vehicle—i.e., facilitates climbing onto the loading surface. This invention is possible only in combination with the upwardly hingeable side wall according to the invention, since the undercarriage protection is not covered with the side wall open.

Other features and embodiments will be disclosed in greater detail in the following description, with reference to the accompanying drawings, which show.

Figure 1A:
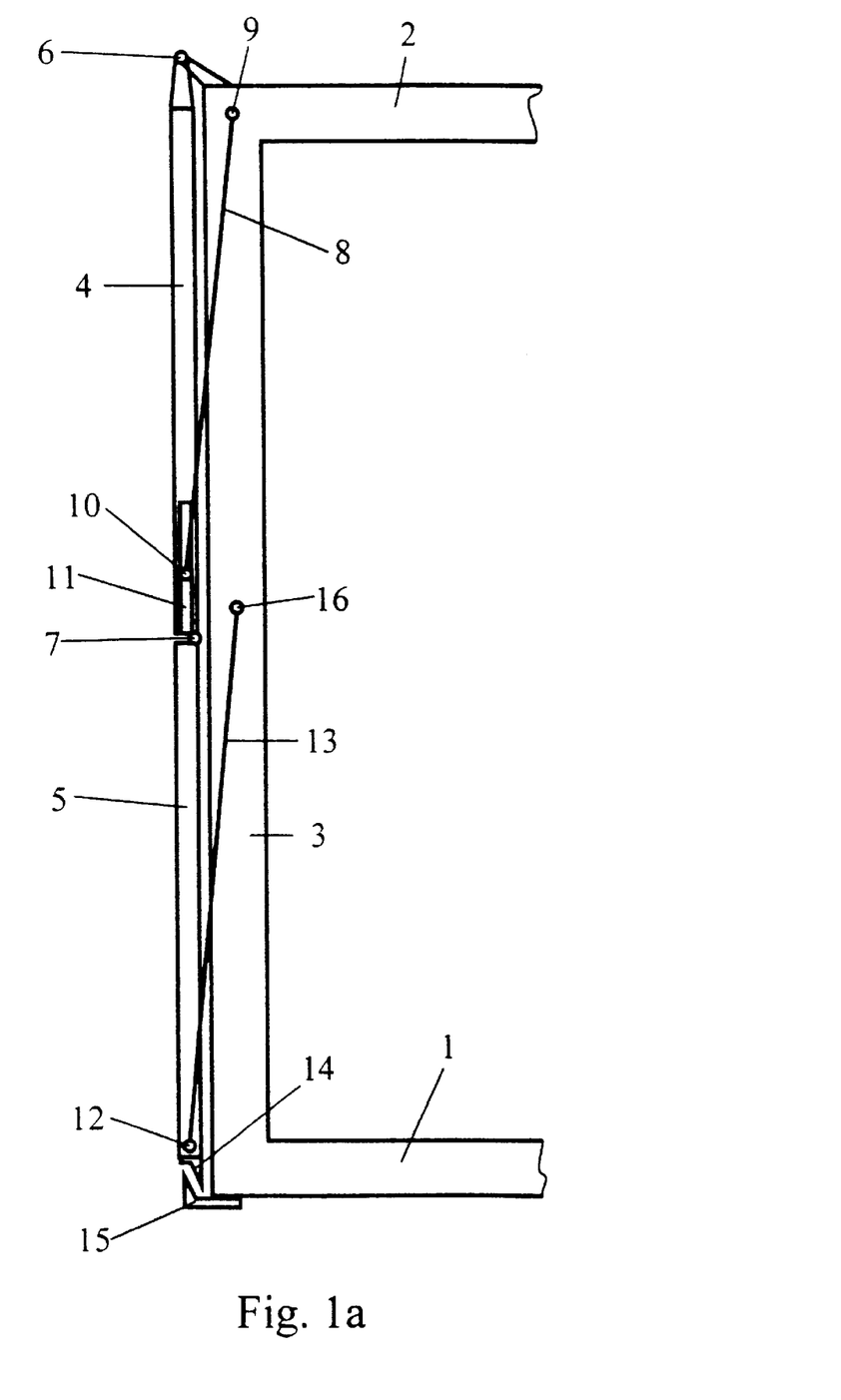
FIG. 1a a side elevation of the side wall according to the invention in the closed state, corresponding to the first end position, FIG. 1b the side wall in the partially opened state, FIG. 1c the side wall in a position with the loading opening already completely opened up, FIG. 1*d* the side wall in its second end position with wall portions completely hinged together on the vehicle roof, FIG. 2*a* a side elevation of an advantageous variant for driving the lifting arm of the side wall according to the invention, FIG. 2*b* a section, taken along the line VI—VI in FIG. 2*a*, FIG. 3*a* a side elevation of the side wall according to the invention in the partially opened state, with a link of variable length, FIG. 3*b* the side wall shows in FIG. 3*a* in the almost closed state, FIG. 3*c* the side wall shown in FIG. 3*a* in the closed state, FIG. 4*a* a side elevation of the side wall according to the invention in the partially opened state, with a link resiliently curved in the shape of an arc, FIG. 4*b* a side elevation of the side wall according to the invention in the partially opened state, with a resiliently displaceable bearing of the link on the second wall portion, FIG. 4*c* a side elevation of the side wall according to the invention in the partially opened state, with a resiliently displaceable bearing of the link on the vehicle body, FIG. 5*a* a diagrammatic side elevation of a lorry with the side wall according to the invention and an undercarriage protection, and FIG. 5*b* a side elevation of an embodiment of the hingeable undercarriage protection according to the invention.

FIG. 1*a* shows a lower transverse portion 1 of a floor frame of a vehicle body, an upper transverse portion 2 of a roof frame and a lateral, substantially vertical upright 3. In the closed state a lateral loading opening of the vehicle body, corresponding substantially to the height of the upright 3, is covered by two wall portions 4, 5 which can take the form, for example, of sheets of rigid material or of frames covered with tarpaulins or the like. Outside the upper corner edge of the vehicle body—i.e., outside the connecting zone of the upright 3 and the upper transverse frame portion 2, the upper wall portion is pivotably connected via a first, horizontal pivot pin 6. The upper longitudinal edge of the lower wall portion 5 is hingeably disposed on the lower longitudinal edge of the upper wall portion 5 via a second pivot pin 7 parallel with the first pivot pin 6. To prevent water, snow, dirt or the like from getting in, if necessary the zone around the pivot pin 6 as far as the upper transverse frame portion 2 can be provided with a flexible covering. For actuation a lifting arm 8 engages with at least one of the two lateral edges of the upper wall portion 4, preferably adjacent its lower longitudinal edge, the lifting arm being articulated by its other end to the upper transverse frame portion 2 of the vehicle body via a third pivot pin 9 parallel with the first pivot pin 6 and the second pivot pin 7. The third pivot pin 9 can be pivoted by means of any desired driving devices, preferably by means of a hydraulic piston and cylinder unit 17, 18. If the first pivot pin 6 and the third pivot pin 9 do not coincide, a compensation of the length of the lifting arm 8 is required for the pivoting of the wall portions 4, 5. If the length of the lifting arm itself cannot be adjusted, the end of the lifting arm 8 must be displaceable in the plane of the upper wall portion 4. In one constructional variant the end of the lifting arm is connected to a guide element such as, for example, a pin 10 or the like, and guided in a guide 11 having the shape of a groove, profile or the like. Such possible displacement is unnecessary if the first pivot pin 6 and the third pivot pin 9 are disposed coaxially. According to the invention an undriven link 13 engages by one of its ends via a pivot 12 with at least one of the two lateral edges of the lower wall portion 5 and is articulated by its other end to the upright 3. Preferably the link 13 is rotatably articulated to the upright 3 via a pivot pin 16 which in the closed end position is disposed in the centre between the third pivot pin 9 and the pivot pin 12. The lower longitudinal edge of the lower wall portion 5 has an attachment 14 in the form of a chamfer which points at the direction of the centre of the vehicle and which when the side wall is in the closed state as shown, engages in a retaining means 15 taking the form of a chamfer on the lower transverse frame portion 1 of the vehicle body complementary with the chamfer of the lower wall portion 5. As a result, the lower longitudinal edge of the lower wall portion 5 is guided securely during the last stage of the movement enclosing the side wall, while in the closed state the side wall is locked against accidental opening. A spring element (not shown) which acts on the two wall portions in the closure direction and prevents opening can also be provided in the zone of the connection between the two side wall portions 4, 5.

Figure 1B:
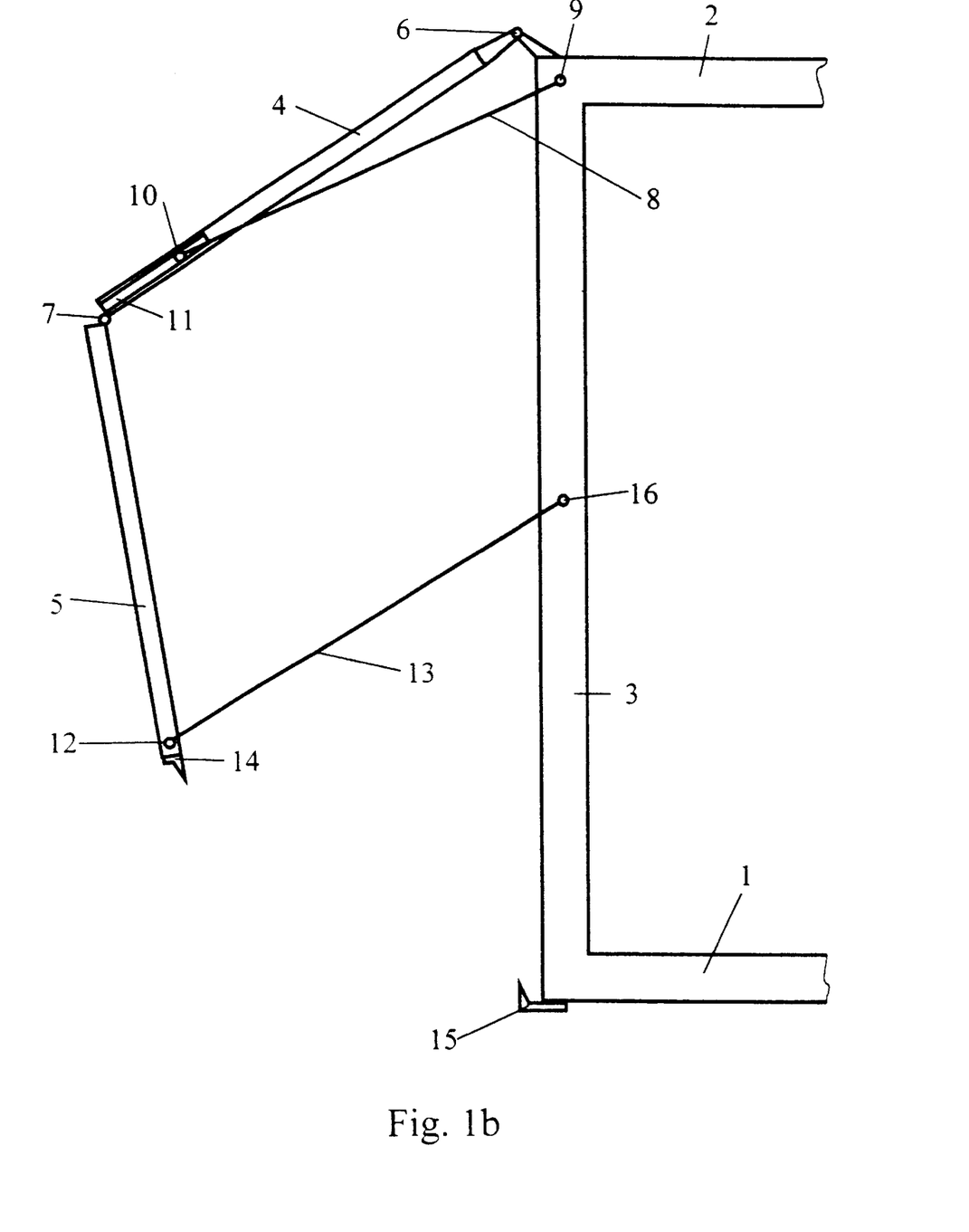

FIG. 1*b* shows the side wall according to the invention in the partially opened position; the loading opening is provided with a covering giving protection against the weather by the laterally projecting upper wall portion 4 and the downwardly extending lower wall portion 5 reliably retained by the link 13. The pin 10 or the like movable in the guide 11 has already moved some distance upwards in said guide 11, since due to the pivoting the relative distance between the pin 10 and the first pivot pin 6 of the upper wall portion 4 and the pin 10 and the pivot pin 9 of the lifting arm 8 respectively has changed.

Figure 1C:
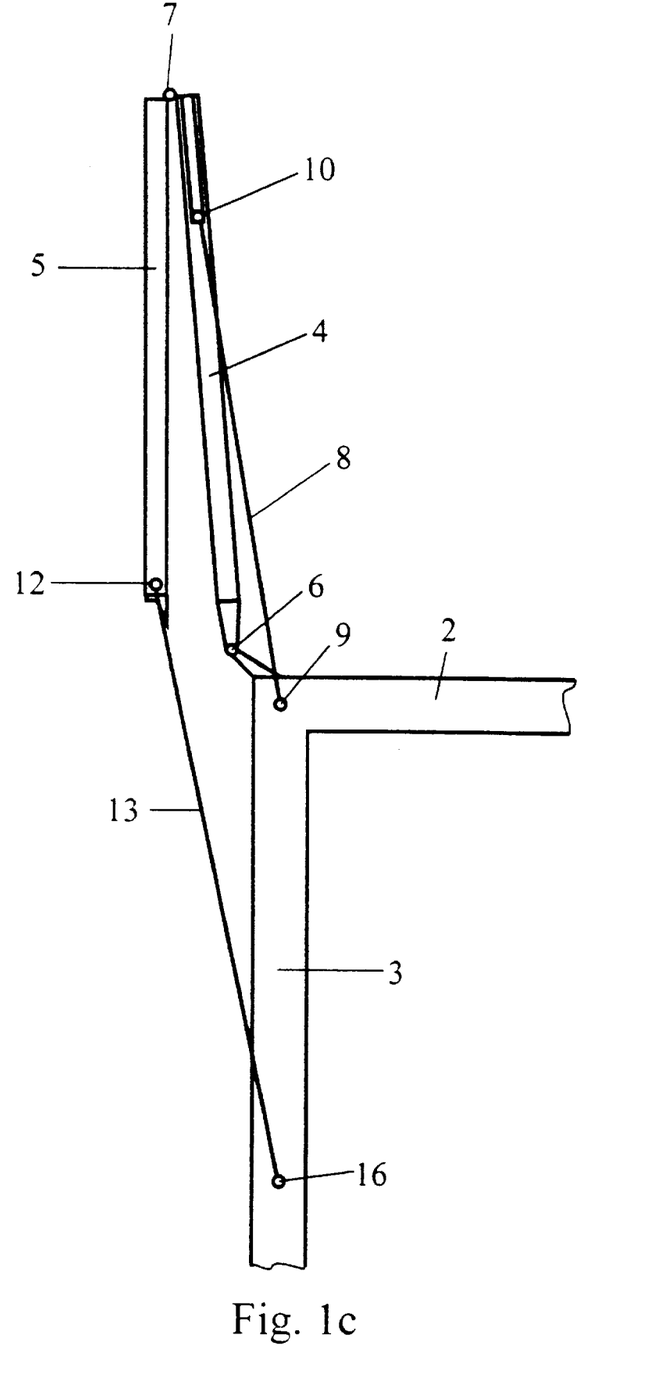
Figure 1D:
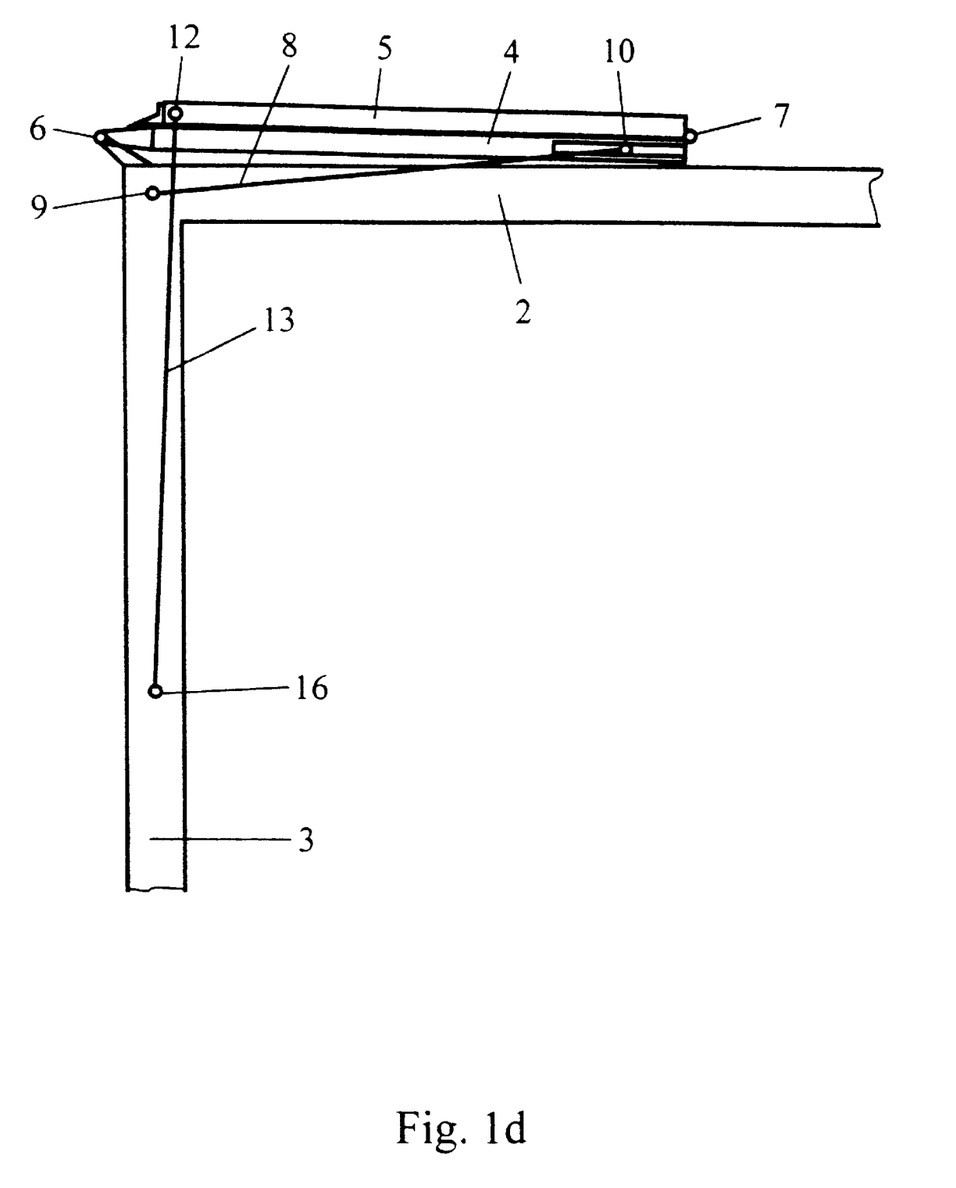

The maximum displacement of the pin 10 in the guide 11 is reached in the position shown in FIG. 1*c*, where the two wall portions 4, 5 are pivoted furthest upwards and lie almost parallel with one another. If the lifting arm 8 can be pivoted even further, the wall portions 4, 5 can be moved into the end position shown in FIG. 1*d*, where the two wall portions 4, 5 lie folded together substantially parallel with one another on the vehicle roof. The side wall therefore requires the minimum space, is no obstacle for loading and unloading work and also allows the vehicle to be driven safely with the side wall opened. In this second end position of the side wall the lifting arm 8 has been pivoted through the total free angular zone in the upper corner area of the vehicle body—i.e., almost 270°. The lifting arm 8 can be enabled to overlap the link 13 by the lateral offsetting of said elements. A different selection of the places of articulation of the or each lifting arm 8 and/or each link 13 makes an arrangement possible in which there is no overlapping even in the closed end position, in which case the lifting arm 8 and the link 13 can be disposed in the same plane, another features which saves space.

Figure 2A:
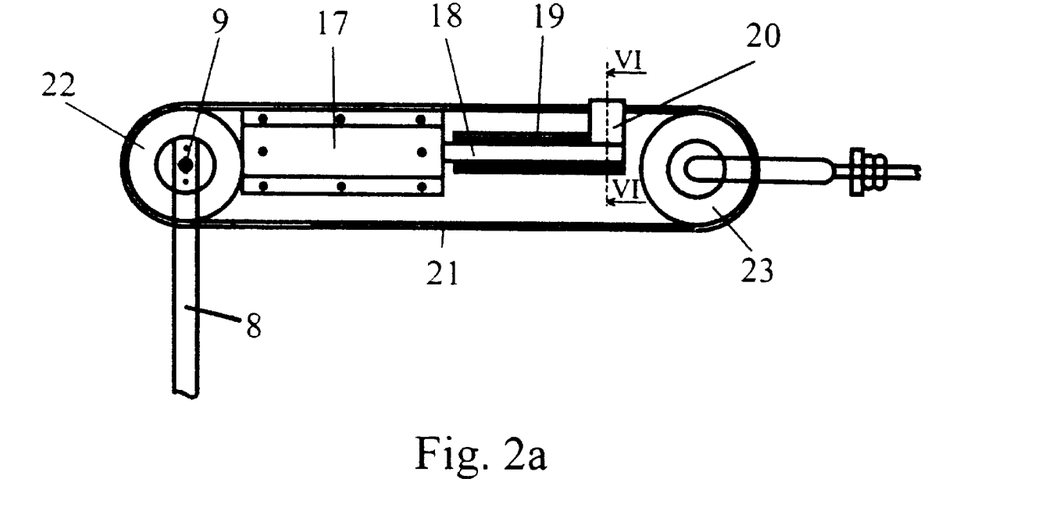
Figure 2B:
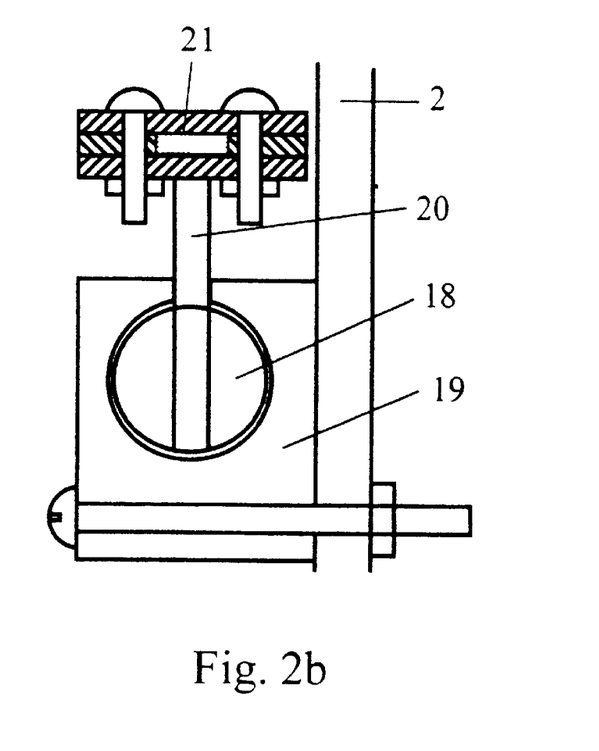

FIGS. 2*a* and 2*b* show an advantageous variant of a drive for the lifting arm. This variant is composed of well-established and operationally reliable elements and forms a satisfactorily adjustable drive for the lifting arm 8. Disposed preferably horizontally on the upper transverse frame portion 2 of the vehicle body roof frame is a hydraulic cylinder 17 whose piston rod 18 is mounted horizontally displaceably in a guide 19. The end of the piston rod 18 remote from the cylinder 17 is attached via, for example, an upwardly extending connecting member 20, to a flexible element 21, for example, a cable, chain, toothed belt, inverted tooth chain or the like. The flexible element 21 is closed upon itself and runs over a curved guide comprising two rollers 22, 23 which are also rotatably disposed on the upper transverse frame portion 2 upstream and downstream of the hydraulic piston and cylinder unit 17, 18, viewed in the direction of its longitudinal axis. While the roller 23 is disposed displaceably but fixably for clamping purposes, the roller 22 is connected non-rotatably to the lifting arm 8 and transmits the movement of the flexible element 21 movable by the piston and cylinder unit 17, 18 to the lifting arm 8. The stroke of the piston and cylinder unit 17, 18 and the distance apart of the two rollers 22, 23 must be so harmonised with one another that the lifting arm 8 can perform the necessary angular movement around its pivot pin 9, preferably through the total free angular zone outside the upper corner of the vehicle body.

Figure 3A:
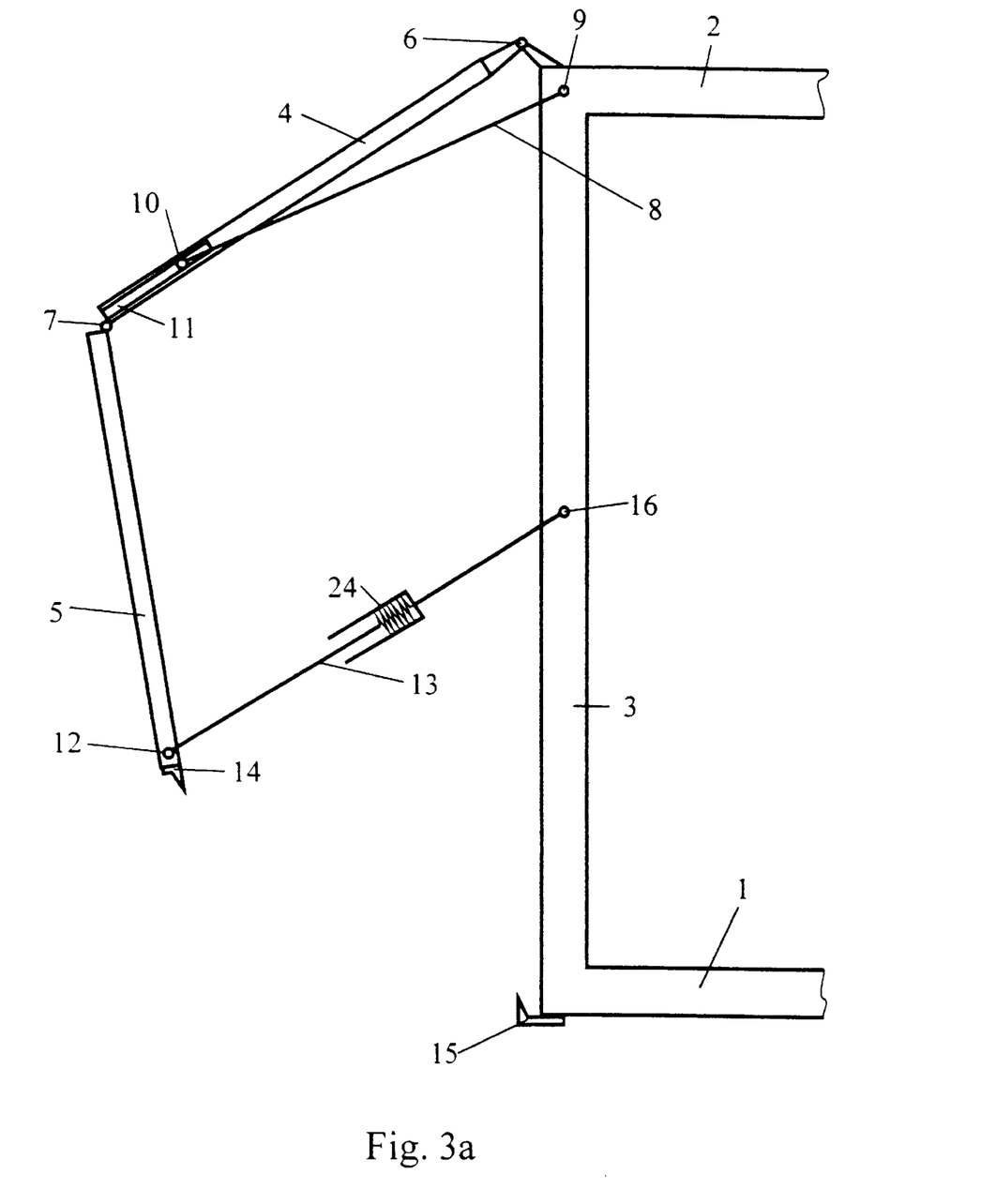

FIG. 3a shows the side wall according to the invention in the partially opened state, the length of the link 13 being adjustable by means of a telescopic arrangement, for example a spring 24 on the link. In the opened position of the side wall the link 13 has its minimum length.

Figure 3B:
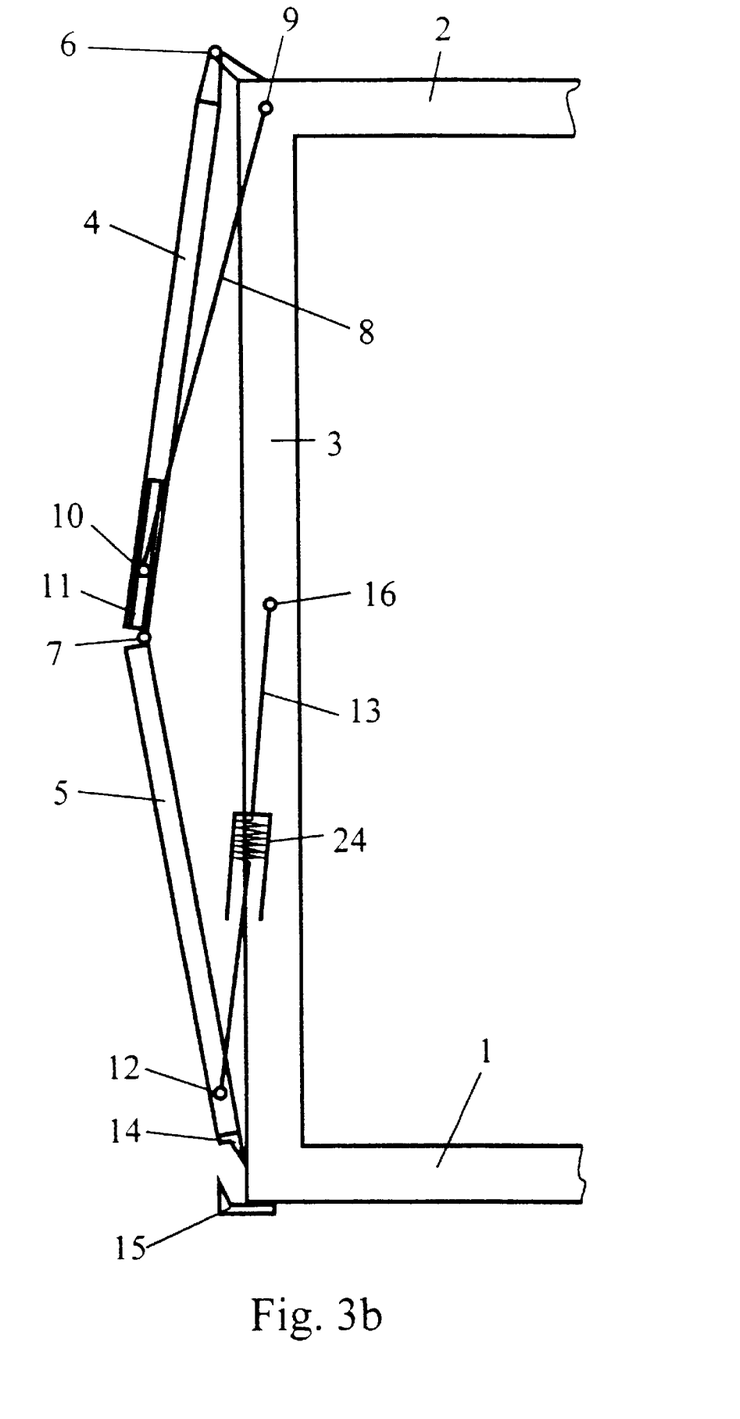

FIG. 3b shows the situation which occurs after contact between the lower wall portion 5 and the upright 3. Due to the shortening of the link 13 produced by means of the spring 24, the lower longitudinal edge of the lower wall portion 5 and the attachment 14 contact the upright 3 of the vehicle body at a small angle. The force of contact between the lower wall portion 5 and the upright 3 is transmitted to the spring 24 or the like, which it expands, so that the link 13 is lengthened. Until the attachment 14 of the lower wall portion 5 contacts the vehicle body, the link 13 performs a purely rotary movement, while after such contact the link 13 mainly performs a longitudinal movement in addition to a very small rotary movement. As a result the lower longitudinal edge of the lower wall portion 5 and the attachment 14 glides reliably, for example into a corresponding guide 15 or the like on the vehicle body.

Figure 3C:
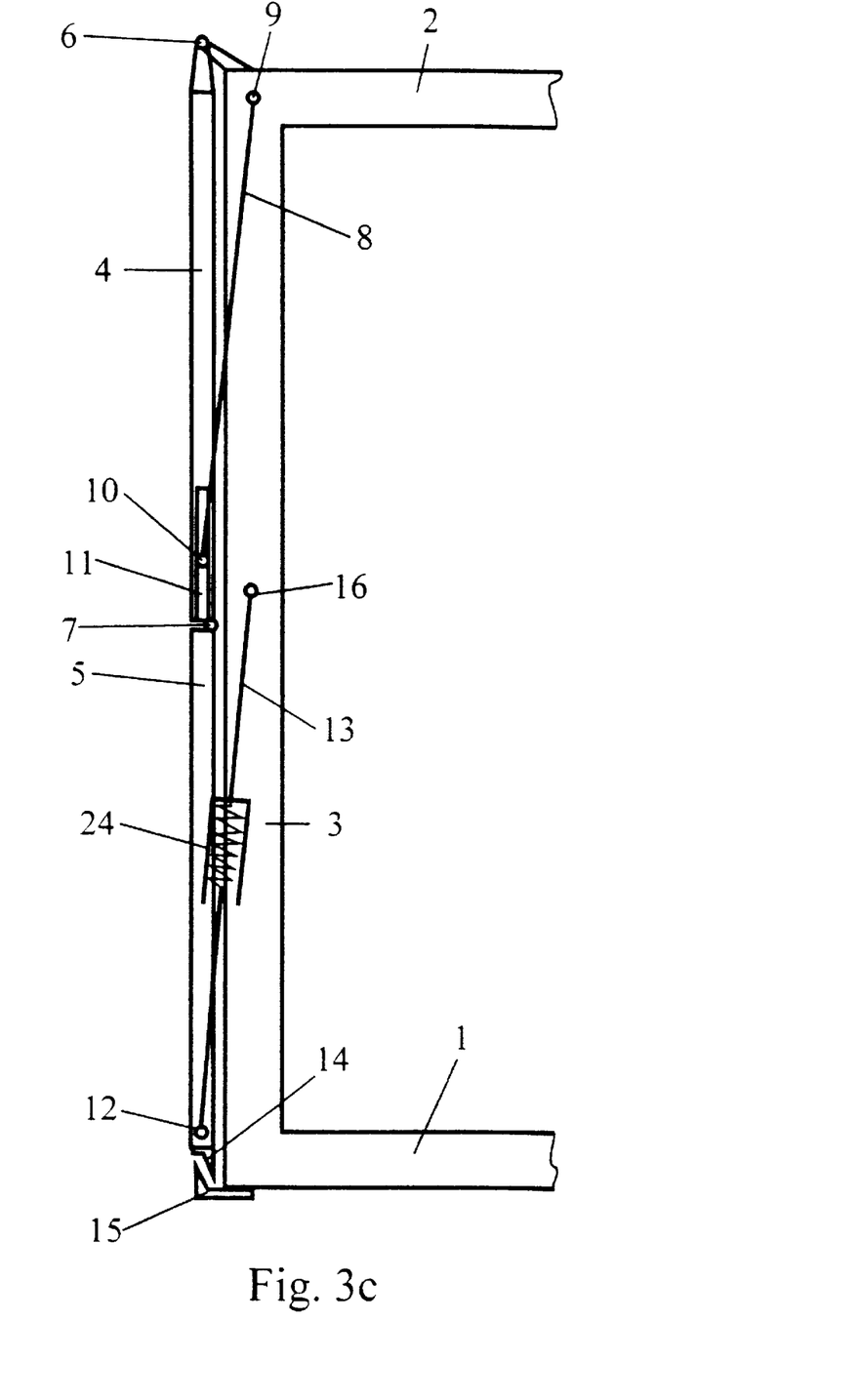

FIG. 3c shows the vehicle side wall when completely closed. In this position the link 13 has its maximum length—i.e., the spring 24 is at its maximum expansion. As a result the side wall 4, 5 can be reliably closed without additional closure means such as, for example, hooks or bolts.

Figure 4A:
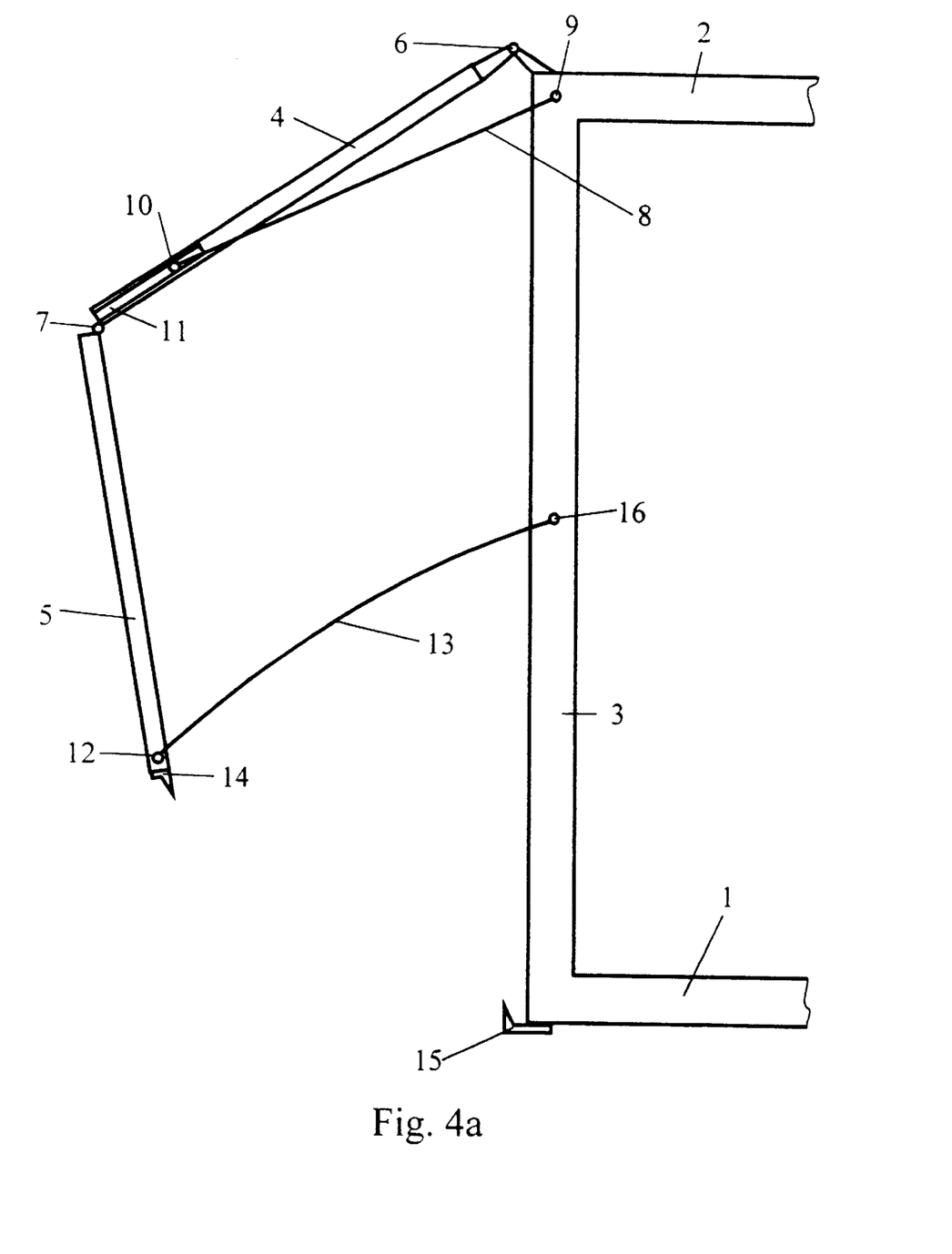
Figure 4B:
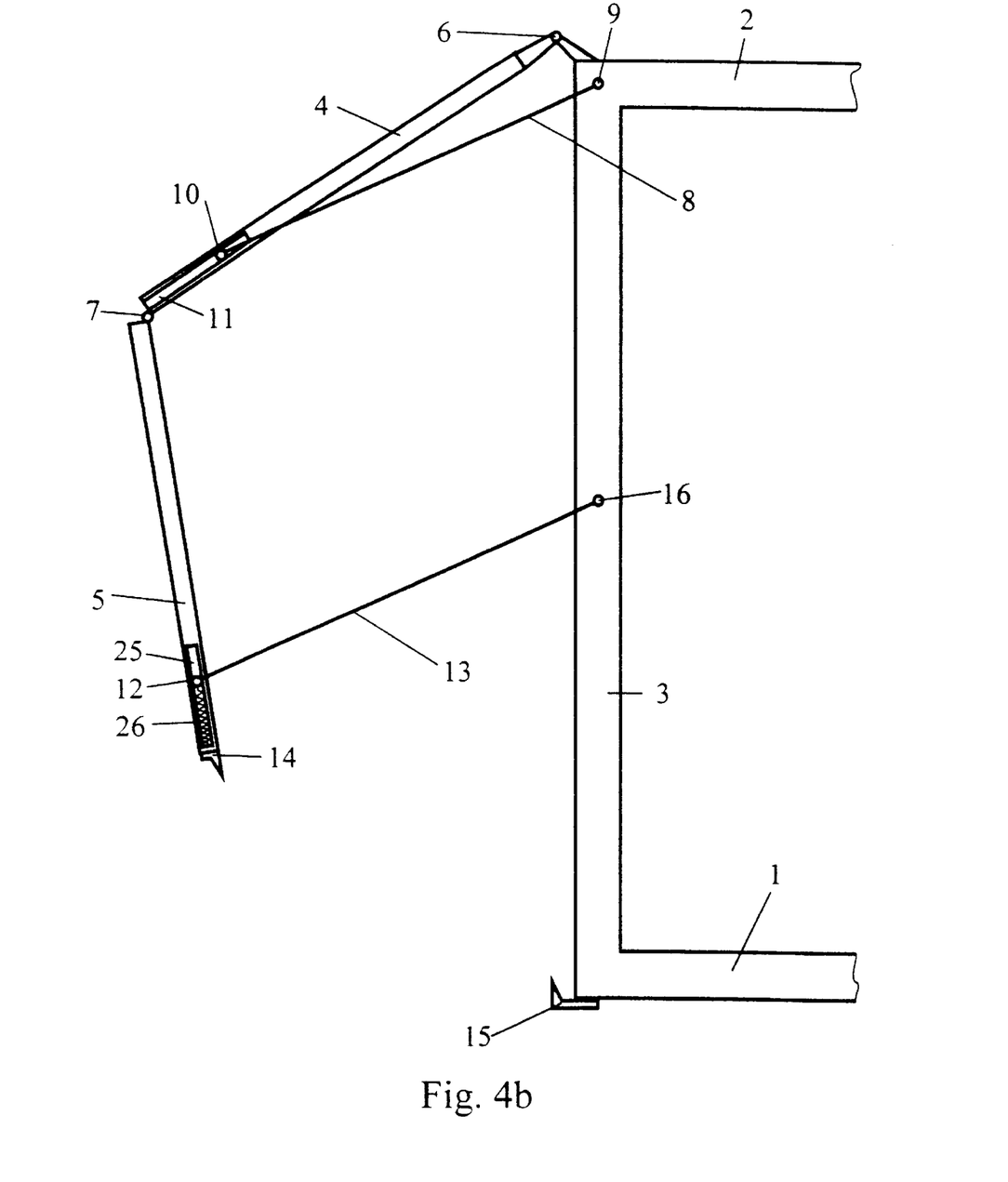
Figure 4C:
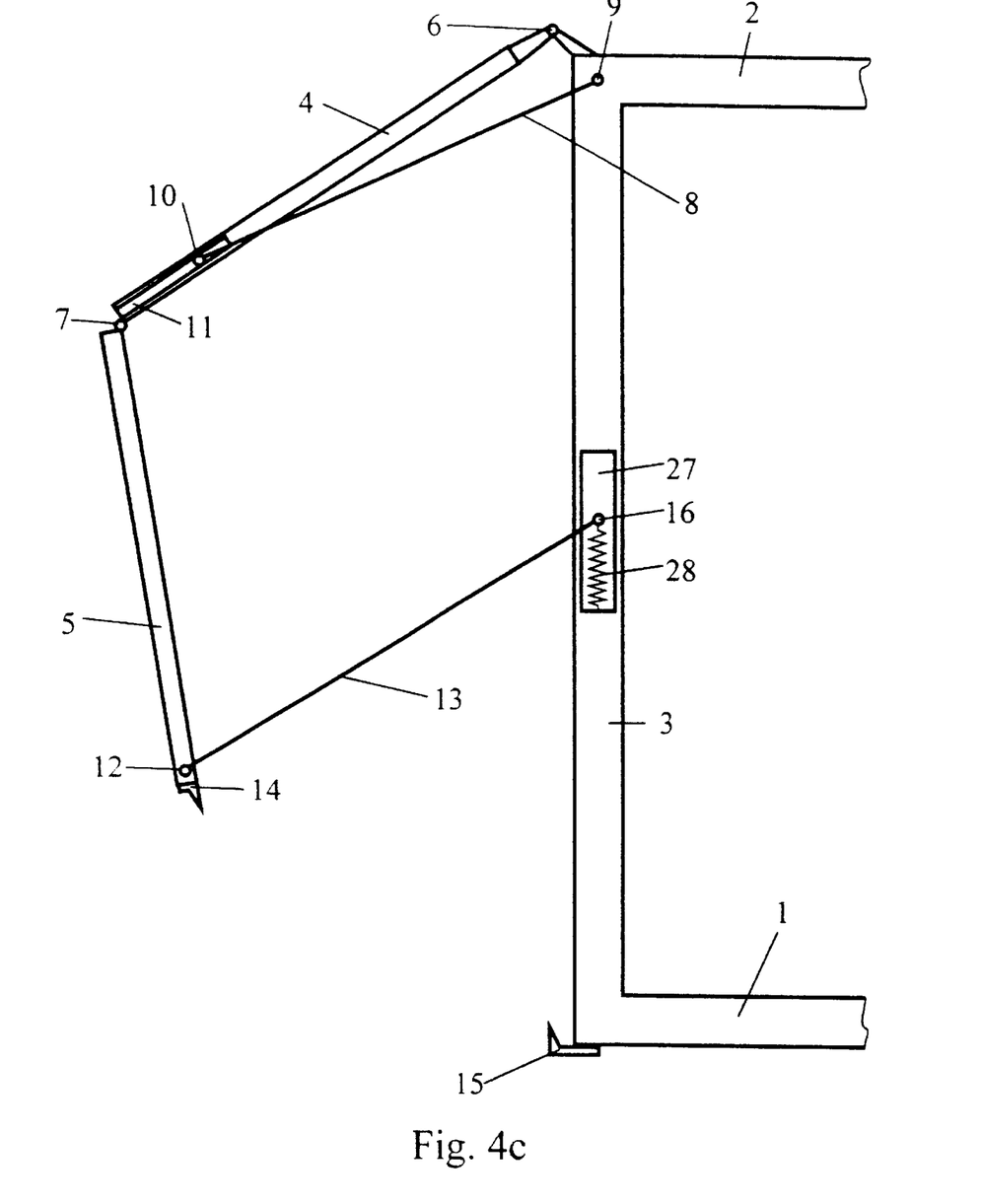

This feature according to the invention can also be achieved by other steps which produce a change in the length of the link 13. The spring 24 or similar arrangements for changing the length of the link 13 illustrated in FIGS. 3a to 3c must not be disposed inside the link 13. The same effect can be produced that due to changing the length of the link 13 by constructional steps at the point of engagement 12 of the link 13 with the lower wall portion 5 or at the point of engagement 16 of the link 13 with the upright 3. FIG. 4a shows an embodiment of a link 13 which is resiliently curved in the shape of an arc. As a result, the distance between the ends 12 and 16 of the link 13 is reduced, without the length of the link 13 being changed. Such an arc-shaped prestressed link 13 can be very cheaply produced, for example, from spring steel or plastics. This embodiment is distinguished by its particular simplicity and therefore also cheapness and freedom from maintenance. In the closure of the side wall the link 13 is stretched against the prestressing. FIG. 4b shows diagrammatically an embodiment of the invention at the point of engagement 12 of the link which comprises a guide 25 in the lower wall portion 5 and a spring 26 or the like. This ensures that during the closure of the vehicle wall, when the lower wall portion 5 comes into contact a force is exerted on and compresses the spring 26 and an apparent lengthening of the link 13 takes place. Also as shown in FIG. 4c a guide 27 and a spring 28 or the like can also be provided at the point of engagement 16 of the link 13 with the vertical portion 3 of the vehicle body. In comparison with the variant shown in FIG. 4b, the variant shown in FIG. 4c has the advantage that as a rule there is more space on the vehicle body for the accommodation of the arrangement for resilient displaceability.

The resilient change in length of the link 13 and the resilient displaceability of the ends of the link and elements connected thereto can of course be put into effect by the most various steps such as, for example, spiral springs, pneumatic springs, hydraulic springs, resilient materials or the like and are not limited to the methods mentioned hereinbefore or illustrated in the drawings.

Figure 5A:
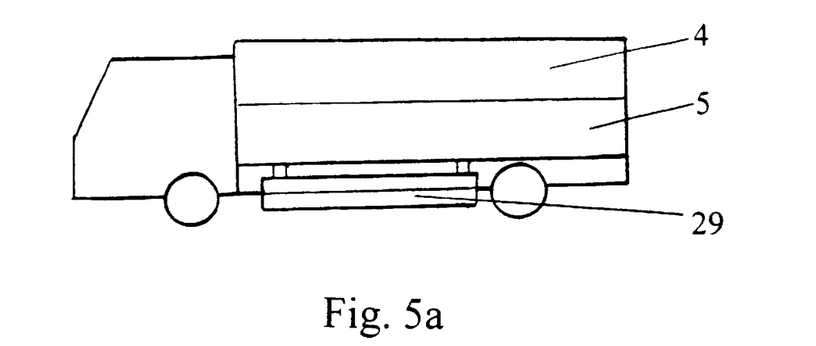
Figure 5B:
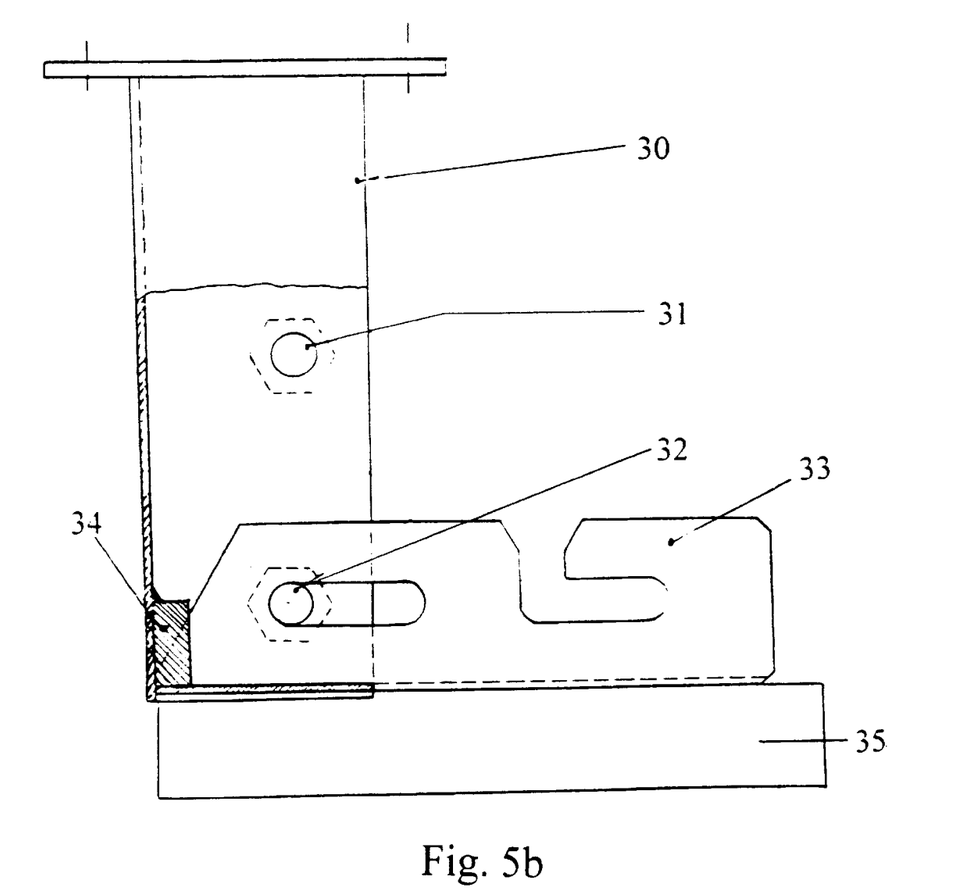

FIG. 5a is a diagrammatic side elevation of a lorry having the side wall according to the invention, comprising the upper wall portion 4 and the lower wall portion 5 and an undercarriage protection 29. FIG. 5b shows the undercarriage protection 29 in detail in the opened-up position. The undercarriage protection 29 mainly comprises an upright 30 attached to the vehicle body and a hingeable portion 35 which acts as a platform. In the embodiment illustrated the mechanism for opening up the undercarriage protection consists of screws, bolts or the like 31, 32 which are attached laterally to the upright 30. A special design of a retaining means 33 mounted on the platform 35 ensures secure anchoring in the upwardly hinged position during travel and allows simple opening-up by the raising of the platform 35. Raising can be facilitated by a handle or the like (not shown) disposed on the platform. In the opened-up state the platform 35 of the undercarriage protection 29 is retained in the horizontal position by a flat iron bar 34 and as a result can be used as a stair. The loading and unloading of the vehicle can be substantially facilitated by means of the undercarriage protection usable as a stair in conjunction with the upwardly hingeable side wall according to the invention.

Of course, various constructional alterations can be made within the scope of the invention.

What is claimed is:

1. A side wall of the body (1, 2, 3) of a vehicle, having an upper wall portion (4) with an upper longitudinal edge and two lateral edges pivotably connected by a first horizontal pivot pin (6) to the vehicle body (1, 2, 3), and a lower wall portion (5) with an upper longitudinal edge and two lateral edges hingeably connected by a second pivot pin (7) parallel with the first pivot pin (6) to a lower longitudinal edge of the upper wall portion (4), a lifting arm (8) engaged at one end with at least one of the two lateral edges of the upper wall portion (4) and articulated at its other end to an upper transverse frame portion (2) of the vehicle body by a third pivot pin (9) which is parallel with the first pivot pin (6) and the second pivot pin (7) and which is pivoted by means of a drive, the two wall portions (4, 5) having end positions, the two wall portions (4, 5) forming in one of the end positions a vertical plane wall for closing a loading opening of the vehicle body (1, 2, 3,) and in the other end position occupying a location above a roof of the vehicle body to define a loading opening, characterized in that an undriven link (13) having ends is engaged by one of the ends by a pivot pin (12) with one of the two lateral edges of the lower wall portion (5) and is at the other end articulated to the vehicle body (1, 2, 3) by a pivot pin (16), the distance between the ends of the link (13) being adjustable.

2. A side wall according to claim 1, wherein the third pivot pin (9) is disposed adjacent the first pivot pin (6).

3. A side wall according to claim 1, wherein the third pivot pin (9) is coaxial with the first pivot pin (6).

4. A side wall according to claim 1, wherein the end of the lifting arm (8) articulated to the upper wall portion (4) is displaceable in the plane of the upper wall portion (4).

5. A side wall according to claim 4, wherein the end of the lifting arm (8) connected to the upper wall portion (4) is guided in a guide (11) provided in the plane of the upper wall portion (4).

6. A side wall according claim 1, wherein the pivot pin (12) is disposed adjacent the lower longitudinal edge of the lower wall portion (5), and the other end of the link (13) is articulated to an upright (3) of the vehicle body (1, 2, 3) in the centre between the third pivot pin (9) connected to the lifting arm (8) and the pivot pin (12).

7. A side wall according to claim 1, wherein the lower longitudinal edge of the lower wall portion (5) has an attachment (14) therefor the vehicle body (1, 2, 3) has a retaining means (15) which engages diametrically oppositely over said attachment (14) in the closed end position of the side wall.

8. A side wall according to claim 1, wherein the first pivot pin (6) is disposed outside an upper corner zone of the vehicle body (1, 2, 3) and the lifting arm (8) can pivot through the total free angular zone, so that in the open end position above the vehicle roof the two wall portions (4, 5) can be folded together substantially parallel with one another and lie on the roof.

9. A side wall according to claim 1, wherein the movable part of the drive is connected to a flexible element (21), said element (21) being guided over a curved guide (22, 23) which is non-rotatably connected to the end of the lifting arm (8) pivotably articulated to the vehicle body (1, 2, 3).

10. A side wall according to claim 1, wherein in that the length of the link (13) can be adjusted by a spring (24).

11. A side wall according to claim 1, wherein the link (13) is resiliently curved in the shape of an arc so that the distance between the ends (12, 16) of the link (13) can be adjusted.

12. A side wall according to claim 1, wherein the the end of the link (13) is mounted on the second wall portion (5) resiliently displaceably in the plane of said second wall portion (5).

13. A side wall according to claim 12, wherein resilient displaceability is provided by a guide (25) oriented in the plane of the second wall portion (5) and a return spring (26).

14. A side wall according to claim 1, wherein the end of the link (13) is mounted on the vehicle body. (1, 2, 3) resiliently displaceably in the plane of the upright (3).

15. A side wall according to claim 14, wherein resilient displaceability is provided by a guide (27) oriented in the plane of the upright (3) and a return spring (28).

16. A side wall according to claim 1, wherein the side wall has undercarriage protection (29) in the form of a pivotable platform (35).

17. A side wall according to claim 7, wherein the lifting arm (8) is engaged with at least one of the two lateral edges of the upper wall portion (4) adjacent its lower longitudinal edge.

18. A side wall according to claim 1, wherein the drive is formed by a hydraulic piston and cylinder unit (17, 18).

19. A side wall of the body (1, 2, 3) of a vehicle, having an upper wall portion (4) with an upper longitudinal edge and two lateral edges pivotably connected by a first horizontal pivot pin (6) to the vehicle body (1, 2, 3), and a lower wall portion (5) with an upper longitudinal edge and two lateral edges hingeably connected by a second pivot pin (7) parallel with the first pivot pin (6) to a lower longitudinal edge of the upper wall portion (4), a lifting arm (8) engaged at one end with at least one of the two lateral edges of the upper wall portion (4) and articulated at its other end to an upper transverse frame portion (2) of the vehicle body by a third pivot pin (9) which is parallel with the first pivot pin (6) and the second pivot pin (7) and which is pivoted by means of a drive, the two wall portions (4, 5) having end positions, the two wall portions (4, 5) forming in one of the end positions a vertical plane wall for closing a loading opening of the vehicle body (1, 2, 3,) and in the other end position occupying a location above a roof of the vehicle body to define a loading opening, characterized in that an undriven link (13) having ends is engaged by one of the ends by a pivot pin (12) with one of the two lateral edges of the lower wall portion (5) and is at the other end articulated to the vehicle body (1, 2, 3) by a pivot pin (16), at least one end of the link (13) being displaceably mounted.

\* \* \* \* \*